(12) United States Patent
Ziarno

(10) Patent No.: US 7,755,512 B2
(45) Date of Patent: *Jul. 13, 2010

(54) WIRELESS ENGINE MONITORING SYSTEM

(75) Inventor: James J. Ziarno, Malabar, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/434,782

(22) Filed: May 4, 2009

(65) Prior Publication Data

US 2009/0231162 A1 Sep. 17, 2009

Related U.S. Application Data

(63) Continuation of application No. 12/206,793, filed on Sep. 9, 2008, now Pat. No. 7,595,739, which is a continuation of application No. 11/156,985, filed on Jun. 20, 2005, now Pat. No. 7,456,756.

(51) Int. Cl.
*G08B 21/00* (2006.01)

(52) U.S. Cl. ............................ 340/945; 701/14; 701/35

(58) Field of Classification Search .................. 340/945, 340/963, 971; 701/14, 35, 3, 9
See application file for complete search history.

(56) References Cited

U.S. PATENT DOCUMENTS

| | | | |
|---|---|---|---|
| 4,642,775 A | 2/1987 | Cline et al. | 364/443 |
| 4,718,229 A | 1/1988 | Riley | 60/39.281 |
| 4,729,102 A | 3/1988 | Miller, Jr. et al. | 364/424 |
| 4,872,182 A | 10/1989 | McRae et al. | 375/1 |
| 4,908,618 A | 3/1990 | Baker et al. | 340/945 |
| 5,022,024 A | 6/1991 | Paneth et al. | 370/50 |
| 5,031,396 A | 7/1991 | Margnelli | 60/39.31 |
| 5,249,417 A | 10/1993 | Duesler et al. | 60/39.02 |
| 5,266,922 A | 11/1993 | Smith et al. | 340/525 |
| 5,339,330 A | 8/1994 | Mallinckrodt | 375/1 |
| 5,351,194 A | 9/1994 | Ross et al. | 364/449 |

(Continued)

FOREIGN PATENT DOCUMENTS

EP    0 407 179 A1    1/1991

(Continued)

OTHER PUBLICATIONS

"Wired Datalink for the Parked Airplane," Paper Presented at AEEC Data Link Subcommittee Meeting, May 16, 1989, 10 pages.

(Continued)

*Primary Examiner*—Brent Swarthout
(74) *Attorney, Agent, or Firm*—Allen, Dyer, Doppelt, Milbrath & Gilchrist, P.A.

(57) ABSTRACT

A wireless engine monitoring system (WEMS) includes an engine monitoring module that is mounted directly on an aircraft engine and records, stores, encrypts and transmits full flight engine data. The system preferably interfaces to the Full Authority Digital Engine Controller/Engine Control Unit (FADEC/ECU) and can record hundreds of engine parameters with a preferred sampling frequency of about one second. The engine monitoring module is preferably formed as a miniaturized module directly mounted on the aircraft engine within its cowling and has a conformal antenna. The engine monitoring module can also upload data for onboard processing.

16 Claims, 7 Drawing Sheets

U.S. PATENT DOCUMENTS

| | | | |
|---|---|---|---|
| 5,359,446 A | 10/1994 | Johnson et al. | 359/152 |
| 5,445,347 A | 8/1995 | Ng | 236/169 |
| 5,459,469 A | 10/1995 | Schuchman et al. | 342/37 |
| 5,463,656 A | 10/1995 | Polivka et al. | 375/200 |
| 5,652,717 A | 7/1997 | Miller et al. | 364/578 |
| 5,757,772 A | 5/1998 | Thornberg et al. | 370/236 |
| 5,761,625 A | 6/1998 | Honcik et al. | 701/14 |
| 5,905,466 A | 5/1999 | Jha | 343/700 |
| 5,943,399 A | 8/1999 | Bannister et al. | 379/88.17 |
| 6,009,356 A | 12/1999 | Monroe | 701/14 |
| 6,047,165 A | 4/2000 | Wright et al. | 455/66.1 |
| 6,088,632 A | 7/2000 | Zaccaria et al. | 701/3 |
| 6,148,179 A | 11/2000 | Wright et al. | 455/66 |
| 6,181,990 B1 | 1/2001 | Grabowsky et al. | 701/14 |
| 6,195,247 B1 | 2/2001 | Cote et al. | 361/253 |
| 6,278,913 B1 | 8/2001 | Jiang | 701/3 |
| 6,308,045 B1 | 10/2001 | Wright et al. | 455/431 |
| 6,353,734 B1 | 3/2002 | Wright et al. | 455/98 |
| 6,385,513 B1 | 5/2002 | Murray et al. | 701/14 |
| 6,498,978 B2 | 12/2002 | Leamy et al. | 701/100 |
| 6,747,577 B2 | 6/2004 | Chakravarty et al. | 390/945 |
| 6,781,513 B1 | 8/2004 | Korkosz et al. | 340/539.1 |
| 6,894,611 B2 | 5/2005 | Butz et al. | 340/539.1 |
| 6,943,699 B2 | 9/2005 | Ziarno | 340/945 |
| 7,456,756 B2 | 11/2008 | Ziarno | 340/945 |
| 2002/0018008 A1 | 2/2002 | Wright et al. | 340/945 |
| 2002/0123915 A1 | 9/2002 | Denning et al. | 705/7 |
| 2003/0066352 A1* | 4/2003 | Leamy et al. | 73/593 |
| 2003/0105565 A1 | 6/2003 | Loda et al. | 701/33 |
| 2003/0148735 A1 | 8/2003 | Wright et al. | 370/343 |

FOREIGN PATENT DOCUMENTS

| | | |
|---|---|---|
| GB | 2 276 006 A | 9/1994 |
| JP | 2002312518 | 10/2002 |
| JP | 2003044546 | 2/2003 |

OTHER PUBLICATIONS

Mini QAR (Quick-Access Recorder), Avionics Test Solutions brochure, published by Avionica, 1996, 3 pages.

Future Concepts for Maintenance, Report of the Portable Maintenance Access Terminal (PMAT) Working Group Meeting, ARINC, 94-205/FCM-69, Sep. 1, 1994, 38 pages.

Gate-Aircraft Terminal Environment Link (Gatelink)—Ground Side, ARINC Specification 632, Dec. 30, 1994.

Airlines Electronic Engineering Committee Letter 91-079/DLK-391, Apr. 5, 1991.

Gate-Aircraft Terminal Environment Link (Gatelink)—Aircraft Side, ARINC Characteristic 751, Jan. 1, 1994.

Aviation Week & Space Technology, "*Safety Board Urges Mandatory Use of FDR/CVRs in Commuter Transports*," Avionics, p. 73, McGraw-Hill, Inc., Aug. 31, 1987.

Aviation Week & Space Technology, "*Conversion Approach Appears Flawed*," Aerospace Business, vol. 139, No. 4, p. 48, McGraw-Hill, Inc., Jul. 31, 1993.

Electronic Engineering Times, "*Module is Result of Work With Apple—Plessey Makes Leap With Wireless LAN*," Nov. 7, 1994.

W.R. Beckman, "*L-1011 Flight Data Recording Systems—Background, Features, Implications and Benefits*," AIAA Aircraft Systems and Technology Conference, Los Angeles, California, Aug. 21-23, 1978, 9 pages (Exhibit 8).

ARINC Characteristic 591, "*Quick Access Recorder For AIDS System (QAR)*," Airlines Electronic Engineering Committee, Aeronautical Radio, Inc., May 18, 1972, 21 pages (Exhibit 9).

Office Action in Ex Parte Reexamination mailed Dec. 19, 2007; U.S. Patent and Trademark Office, U.S. Appl. No. 90/008,567, filed Mar. 30, 2007; 21 pages.

"McGraw-Hill Illustrated Telecom Dictionary," Jade Clayton, 1998, pp. 390,391.

\* cited by examiner

WIRELESS ENGINE MONITORING SYSTEM

RELATED APPLICATION

This application is a continuation of Ser. No. 12/206,793 filed Sep. 9, 2008 now U.S. Pat. No. 7,595,739, which is a continuation of Ser. No. 11/156,985 filed on Jun. 20, 2005 (now U.S. Pat. No. 7,456,756 issued Nov. 25, 2008), which is based on Ser. No. 10/774,578 filed Feb. 9, 2004 (now U.S. Pat. No. 6,943,699 issued Sep. 13, 2005), which is based on provisional application Ser. No. 60/489,368 filed Jul. 23, 2003, the disclosures of which are hereby incorporated by reference in their entirety.

FIELD OF THE INVENTION

The present invention relates to a system and method for monitoring aircraft engines, and more particularly, this invention relates to a system and method for determining an aircraft engine's current performance and downloading data for each engine of an aircraft and processing the engine data for engine maintenance and other analysis.

BACKGROUND OF THE INVENTION

The Federal Aviation Administration and other international aviation regulatory agencies require commercial airlines to monitor the health and status of aircraft engines. Any health and status information is used to determine the current performance for an aircraft engine and determine if maintenance is required. Prior art techniques have been limited because of data latency and the limited amount of collected data restricted analysis. Typically, gross indicators were measured using prior art monitoring systems. Any resultant maintenance actions were reactive. For example, some prior art systems took a "snapshot" of only basic engine parameters, for example, when the aircraft had lifted to 1,000 feet after initial take-off. This data was limited to one time slot during flight and was not real time. This data never gave analysts a complete picture of an engine performance during flight. As a result, advanced prognostics and diagnostic techniques have not been used by prior art engine analysis systems.

Many jet engine original equipment manufacturers (OEMs), jet engine service providers that are contractually bound under engine maintenance cost per hour (MCPH) agreements, airline transport companies and military and commercial aviation companies have desired a system and method to monitor performance of an aircraft engine in real time and archive that data. Up to now, prior art systems were limited in their analysis to the prior art data "snapshots" and did not go beyond gross indicators and reactive maintenance techniques. In some prior art techniques, airlines have complied with regulatory requirements using several different monitoring systems. In one monitoring system, limited engine parameters (e.g., N1, N2, EGT and $W_f$) have been logged by pilots in aircraft log books. As noted before, automated engine data also was recorded at take-off/cruise at 1,000 feet as a "snapshot" that is recorded either "on board" or downloaded via ACARS using a VHF communication data link. This engine data resulted in a limited engine analysis because only one "snapshot" of the engine performance had been used and the "snapshot" never gave a true indication of engine performance during flight of the aircraft.

Harris Corporation of Melbourne, Fla. has designed a system and method of recording performance of an aircraft engine using a ground data link unit that interfaces with numerous components of the aircraft, including the DFDAU, the aircraft digital flight data recorder DFDR, and the data multiplexing system commonly referred to as the Full Authority Digital Engine Control (FADEC) for larger jet turbine engines or Engine Control Unit (ECU) as sometimes referred with smaller jet turbine engines used on smaller aircraft, including turboprops or other engines generating less than 15,000 pounds of thrust. Hereinafter, the term "FADEC/ECU" will be used corresponding to either the term "FADEC" or "ECU" as used by the industry.

An example of the Harris Corporation ground data link unit is disclosed in commonly assigned U.S. Pat. No. 6,047,165, and an engine monitoring system using the ground data link unit is disclosed in U.S. Pat. Nos. 6,148,179 and 6,353,734, the disclosures which are hereby incorporated by reference in their entirety.

In the incorporated by reference '179 and '734 patents, the system and method as disclosed can provide a record of the performance of an aircraft engine by collecting engine data during engine operation, for example, in the ground data link unit, and downloading the collected engine data over a wideband spread spectrum communications signal to a ground based spread spectrum receiver. The signal is demodulated within a ground based spread spectrum receiver to obtain the engine data for further processing. It is also possible to upload data to the ground data link unit, such as algorithms, flight management files, video and entertainment files and other data files. Although the ground data link unit as disclosed in these incorporated by reference patents is a major improvement over prior art solutions for engine monitoring, the disclosed ground data link unit is typically a large unit and interfaces with many airborne systems as described before. It would be advantageous to monitor engines in real time without resorting to the larger ground data link unit that interfaces with many systems, or by a smaller unit when the disclosed ground data link unit is not available.

SUMMARY OF THE INVENTION

In accordance with the present invention the wireless engine monitoring system (WEMS) of the present invention overcomes the disadvantages of the prior art described above and is an engine mounted engine monitoring module mounted directly on the aircraft engine. It is not installed in an avionics department or similar fuselage location, such as the preferred location for a ground data link unit connected to many airborne units as disclosed in the incorporated by reference '179 and '734 patents. The WEMS module is interfaced to the Full Authority Digital Engine Controller (FADEC)/Engine Control Unit (EDU) on the engine. The WEMS is a small module of about 2×2×4 inches and can record, store, encrypt and transmit "full flight" engine data. It interfaces directly to the FADEC/EDU and records hundreds of engine parameters with one second sampling frequency, as one non-limiting example. It is a miniaturized module with a preferred conformal antenna and RF transceiver to download (and upload) data using RF/802.11/cellular techniques, including any other spread spectrum techniques.

The "full flight" engine data allows advanced prognostics and diagnostics techniques and increases engine "time on wing" and decreases engine maintenance costs. The WEMS data could be downloaded via RF/(802.11) spread spectrum/cellular to an airport server for processing and/or transported over the internet, PSTN, cellular system or other communications network to another workstation for real-time analysis. Data can be uploaded to the wireless engine monitoring system module, including algorithms for on-board processing.

The system and method of the present invention is an automated wireless solution installed directly on the engine. It records full flight engine data for large and small turbine engines and has large megabyte files, using a high speed data link to extract. The system can use a wideband spread spectrum communications signal in accordance with 802.11 standards, e.g., the technology as disclosed in the incorporated by reference '165 and '734 patents.

In accordance with the present invention, the system and method provides a record of the performance of an aircraft engine. An engine monitoring module is mounted on the aircraft engine and collects engine data relating to operation of the aircraft engine. The engine monitoring module includes a transmitter for transmitting the engine data over a wireless communications signal. The receiver receives the transmitted engine data.

In one aspect of the present invention, the transmitter preferably comprises a spread spectrum transmitter for transmitting the engine data over a wideband spread spectrum communications signal. A conformal antenna, such as a patch antenna, is preferably mounted on the engine monitoring module to which the wireless communications signal is transmitted. A processor is operative for receiving the engine data from the receiver and further processing of the engine data. The engine data can be transferred from the receiver to the processor using an internet, a public switched telephone network, a cellular network or other communications network.

In yet another aspect of the present invention, a FADEC/ECU is operative with the aircraft engine for collecting engine data. The engine monitoring module is electrically connected to the FADEC/ECU for collecting engine data. A data address is preferably assigned to the engine monitoring module and links the data address to an engine serial number for tracking the aircraft engine. This data address preferably comprises an internet address. The engine monitoring module could also include a receiver as part of a transceiver for uploading data for onboard processing, including various algorithms used for engine monitoring.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

The present invention is a wireless engine monitoring system (WEMS) and can use basic components of the ground data link unit as disclosed in the incorporated by reference '165, '179 and '734 patents. The system of the present invention is reduced in function and size for a WEMS module and is mounted directly to the jet engine and preferably interfaces with the FADEC/ECU. The present invention is operative for downloading data using a wireless communications signal, preferably a wideband spread spectrum communications signal, in a similar manner to the wireless ground link-based aircraft data communications system disclosed in the above incorporated by reference '165, '179 and '734 patents. It could also download via any RF connection.

Figure 1:
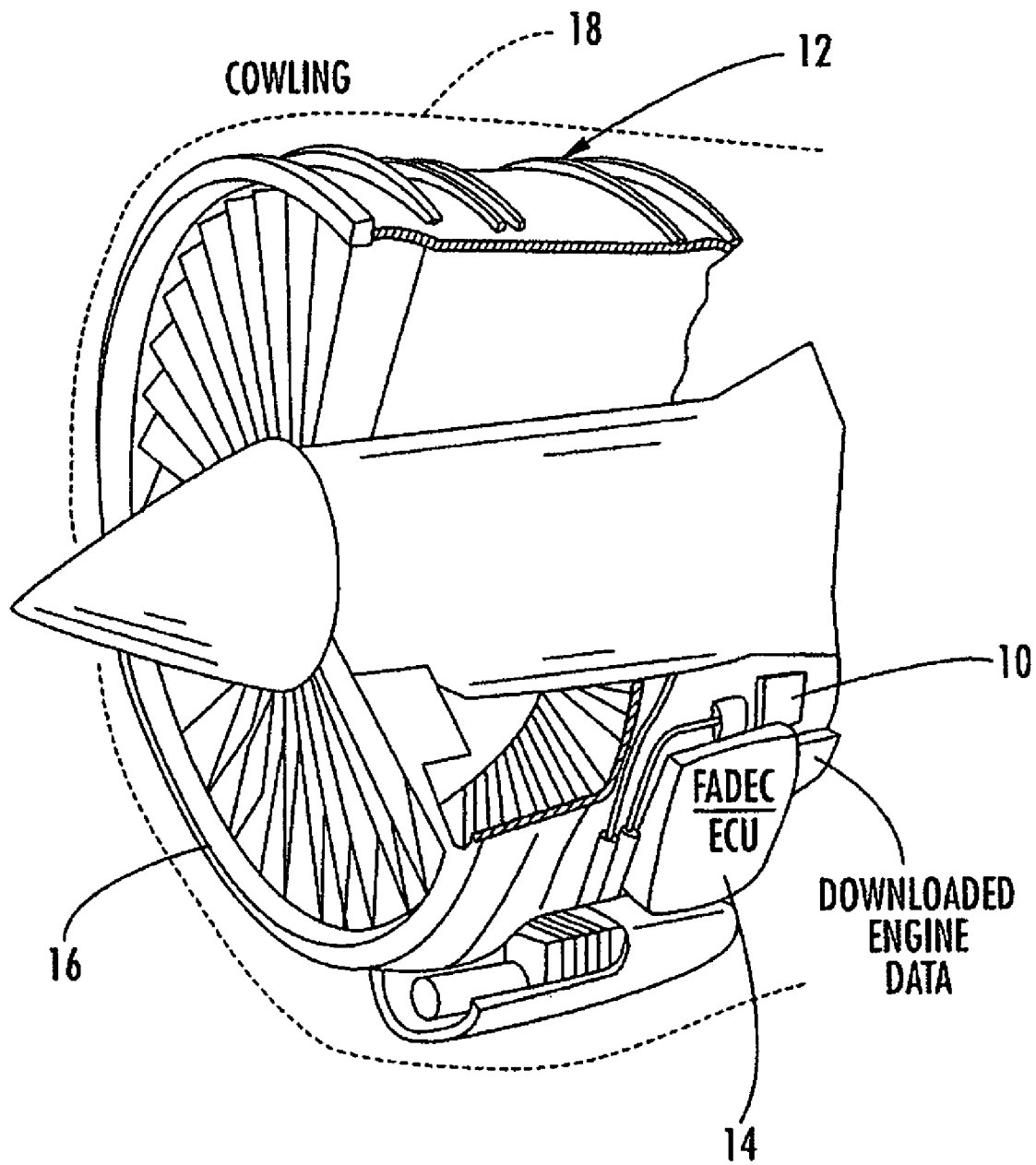
FIG. 1 is a partial fragmentary, isometric view of a jet engine showing the FADEC/ECU and the WEMS module mounted on the engine, the WEMS module interfacing with the FADEC/ECU for downloading engine monitoring data, in accordance with the present invention.

FIG. 1 shows a WEMS module 10 that is mounted directly on the jet engine 12 and electrically connected to the FADEC/ECU control unit 14, which is also mounted on the jet engine. The jet engine 12 shows basic elements of the turbine 16 and other components. The jet engine cowling 18 is shown in dashed lines and WEMS module 10 is disposed within the cowling. The WEMS module 10 of the present invention includes basic functional RF and memory components, such as disclosed in the ground data link unit of the incorporated by reference '165, '179 and '734 patents. The WEMS module can be mounted at different locations on the engine depending on the type of preferred conformal antenna and the nature of the cowling 18 used in the jet engine.

Figure 2:
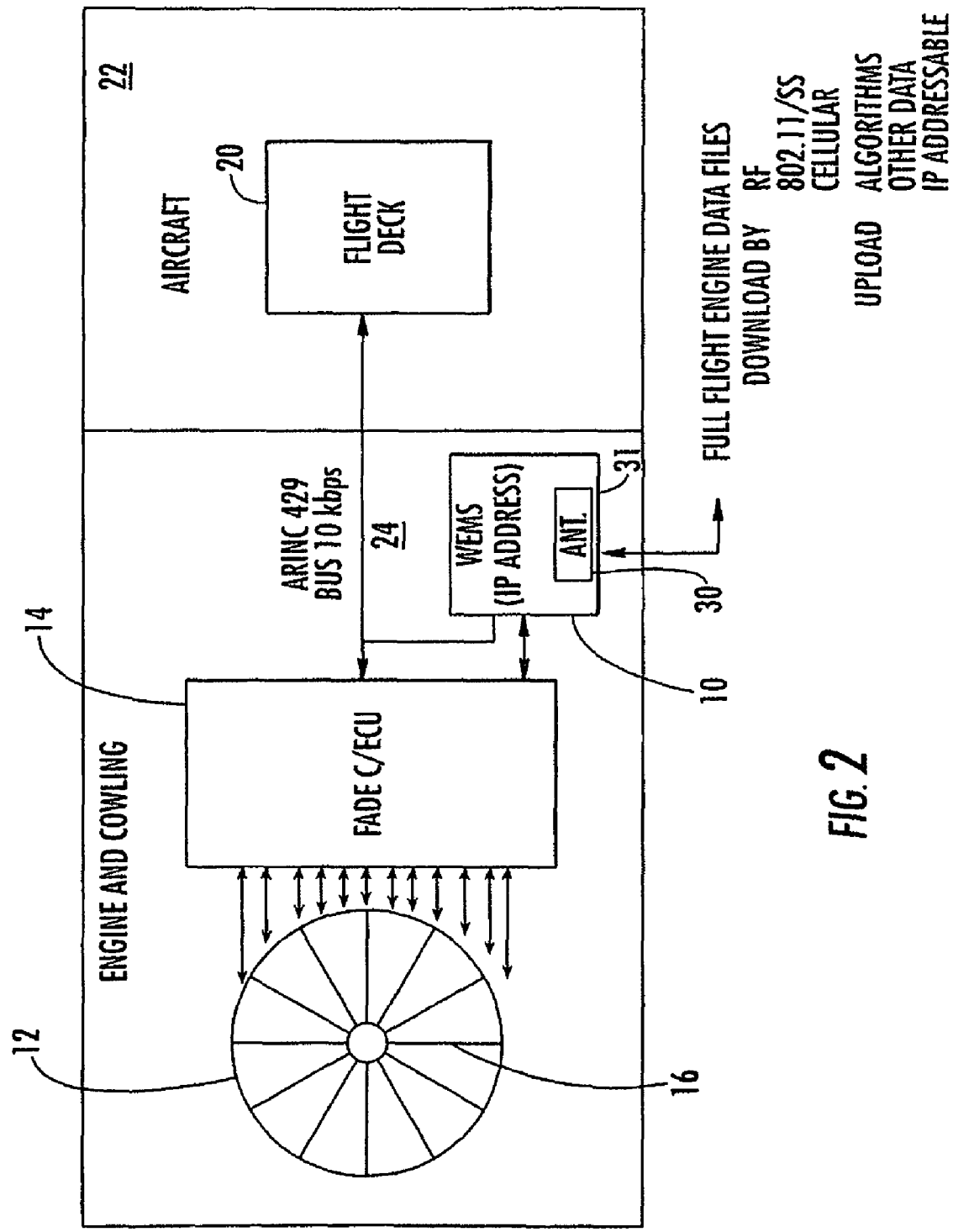
FIG. 2 is a block diagram showing the aircraft engine and aircraft, and the WEMS module of the present invention interfaced with the FADEC/ECU for downloading full flight engine data files and uploading algorithms and other data.

FIG. 2 shows a basic block diagram of a FADEC/ECU 14 that is operative as a bidirectional multiplexer for signals to and from the jet engine 12. The signals include analog and digital signals and the FADEC/ECU 14 gives commands to the engine from the flight deck 20 of the aircraft 22. It also transmits engine status and health signals. Many signals are processed by the FADEC/ECU 14, which then transmits the signals over an ARINC 429 bus 24 in this non-limiting example at typically 10 kilobits per second to and from the flight deck 20.

The WEMS module 10 of the present invention has a separate IP address (for each module), which is linked to the serial number of the engine. The WEMS module is mounted on the engine and interfaces with the FADEC/ECU such as through another port on the FADEC/ECU or directly into the ARINC 429 bus. The radio frequency transceiver capability is built into the WEMS module and is operative for recording, compressing and encrypting full flight data files. It typically will use a conformal antenna 30 that is formed as a small patch antenna the size of a postage stamp, for example, mounted on a casing 31 that forms a protective housing for the WEMS module 10. Although a conformal antenna is preferred, a separate antenna could possibly be used depending on the cowling and engine type on which the WEMS module 10 is mounted. A separate antenna could be mounted on a separate location on the fuselage or other location for enhancing communication.

The WEMS module 10 can use an archival data store for recording, storing and encrypting and then later transmitting "full flight" engine data. The WEMS module 10 of the present invention can record hundreds of engine parameters with a preferred one second sampling frequency. The WEMS module thus allows advanced prognostics and diagnostic techniques to increase "time on wing" and decrease engine maintenance costs. For example, the WEMS module 10 could be operative with jet engine diagnostic cells, such as used with prognostic and health management applications, including those designed by Impact Technologies, LLC of Rochester, N.Y. The WEMS module 10 can download engine data by almost any type of radio frequency signal, including spread spectrum modulation techniques. The WEMS module 10 could be operative with cellular, internet, or PSTN communication infrastructures to download full flight engine data files and upload algorithms or other data or programs Each WEMS module will typically include a separate IP address such that it can be separately addressable for identification and upload and download of data.

Figure 3:
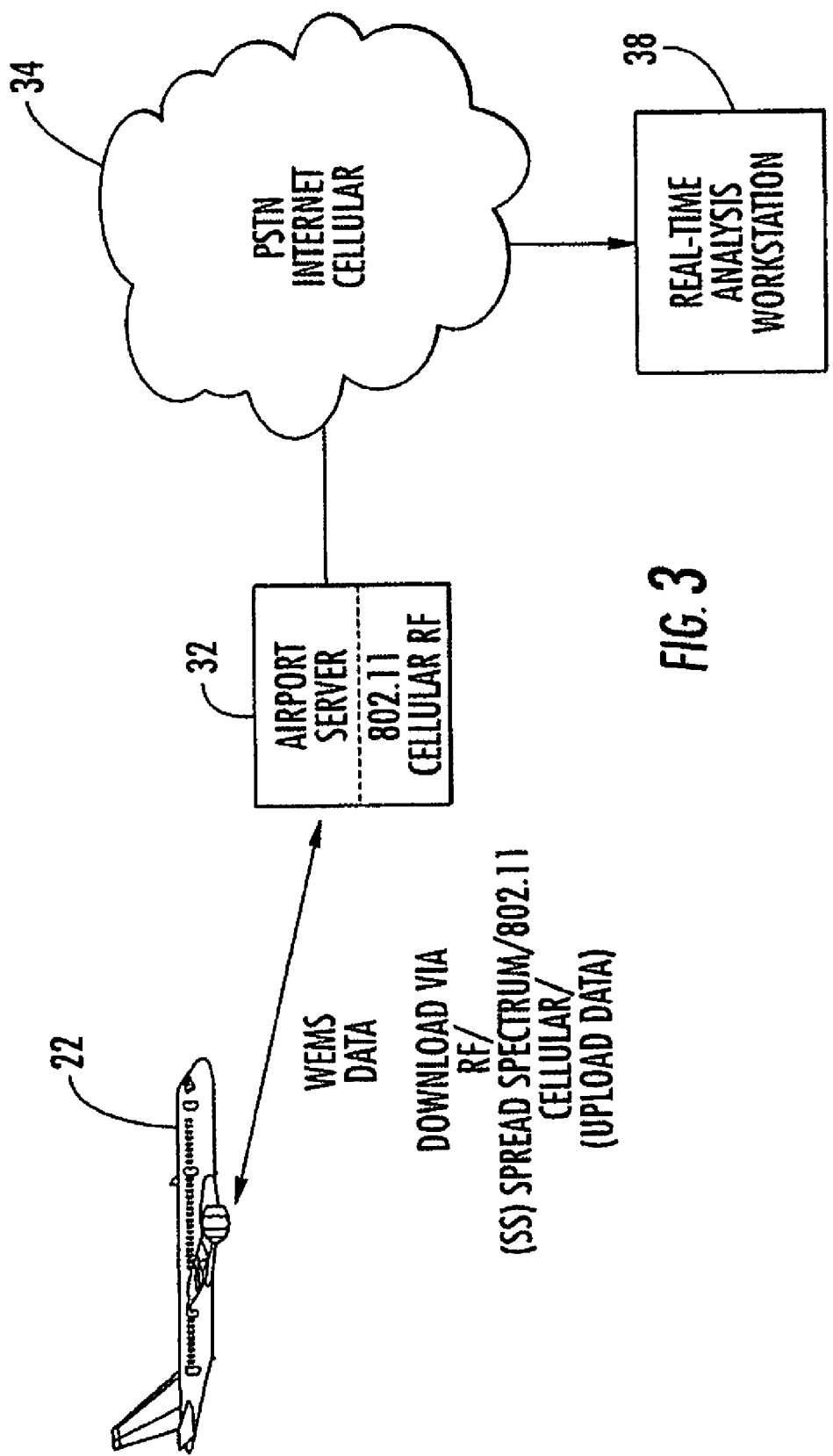
FIG. 3 is a fragmentary, block diagram showing WEMS engine data that can be downloaded to an airport server and transferred by PSTN, internet or cellular infrastructure to a real-time analysis workstation or other processor.

FIG. 3 shows a high level block diagram of an aircraft 22 that includes the WEMS module 10, which downloads engine data and uploads data for onboard processing to and/or from an airport server 32, which could be operative with a communications network 34, such as a public switched telephone network (PSTN), the internet or a cellular infrastructure. The airport server 32 includes a receiver and transmitter and communicates through the communications network 34 to a real-time analysis workstation or other similar processor 38 where the engine data can be analyzed to determine the best maintenance program for an engine, and thus, extend the time the engine remains on the plane without removing the engine. The real-time analysis workstation 38 could be directly connected to the airport server or could receive data directly from the WEMS module 10, in accordance with the present invention.

As noted before, the WEMS module 10 can be operative similar to the ground data link unit in that it stores data and transmits the data using a preferred spread spectrum or other wireless communications signal. The WEMS module 10 is much smaller, however, and mounts directly onto the aircraft engine. It has fewer functions than the functions required by a large scale ground data link unit, which is operative with many aircraft components, including the DFDAU, DFDR and engine sensors.

Figure 4:
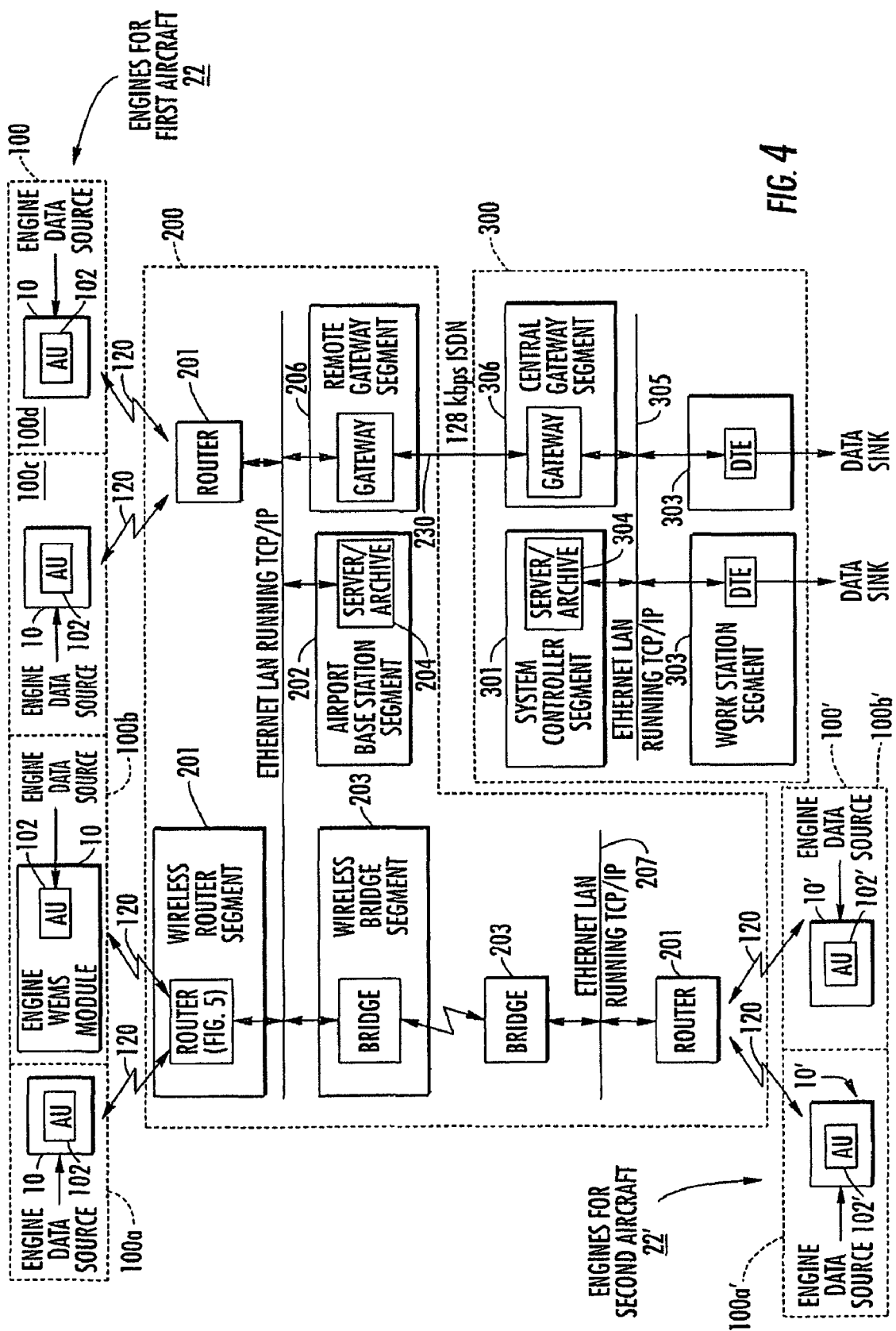
FIG. 4 is a block diagram showing basic elements that can be used in the present invention.

Referring now to FIG. 4, there is shown a representative example of an overall communications system architecture for a wireless spread spectrum data communications system that can be used with the WEMS module 10 of the present invention. The architecture in this example has three interlinked subsystems: (1) an engine WEMS subsystem 100; (2) a ground subsystem 200 (typically airport based but not necessarily at the airport); and (3) a remote engine data control center 300 used for analyzing any downloaded engine data. The WEMS system 100 for one aircraft 22 could include a plurality of WEMS modules 10, each installed on an engine 100a-d. Two aircraft 22 and 22' are illustrated each with respective WEMS modules 10, 10'. Each WEMS module 10, 10' includes an airborne unit (AU) 102, 102', each which includes the processor, transceiver, memory and other necessary components. Each WEMS module 10, 10' is operative to communicate with a wireless router (WR) segment 201 of the ground subsystem 200 through a wireless communications link 120. The following description proceeds with reference to one aircraft 22 and WEMS module 10 for purposes of description.

The wireless router segment 201 routes the engine data files it receives from the WEMS module 10, either directly to an airport base station 202 via a wired Ethernet LAN 207, or indirectly through local area networks 207 and airport-resident wireless bridge segments 203 in this one non-limiting example. The wireless communication link 120 can be a spread spectrum radio frequency (RF) link having a carrier frequency lying in an unlicensed portion of the electromagnetic spectrum, such as within the 2.4-2.5 GHz S-band as one non-limiting example. The wireless communication link 120 could also be an RF, internet, cellular, or other link.

The ground subsystem 200 in this example includes a plurality of ground and/or airport-resident wireless router segments 201, one or more of which are distributed within the environments of the various airports served by the system. A respective ground and/or airport wireless router 201 is operative to receive engine data that is wirelessly down-linked from a WEMS module 10. Each ground subsystem wireless router 201 can forward engine data to a server/archive computer terminal 204 of a base station 202, which can reside on a local area network 207 of the ground subsystem 200 at an airport or other location.

The base station 202 can be coupled via a local communications path 207, to which a remote gateway (RG) segment 206 is interfaced over a communications path 230, to a central gateway (CG) segment 306 of a remote engine data control center 300, where engine data files from various aircraft are analyzed. As a non-limiting example, the communications path 230 can include an ISDN telephone company (Telco) land line, and the gateway segments can include standard LAN interfaces. Other communications networks, such as cellular, internet, or other wireless communications can be used. It should be observed that other communications media, such as a satellite links or cellular, for example, may be employed for ground subsystem-to-control center communications without departing from the scope of the invention.

The remote engine data control center 300 could include a system controller (SC) segment 301 and a plurality of workstations (WS) 303, which are interlinked to the systems controller 301 via a local area network 305. Engine safety, maintenance, and monitoring analysts are at the remote engine data control center 300 to evaluate the engine data files conveyed to the remote engine data control center 300 from the airport base station segments 202 of the ground subsystem 200. The respective workstations 303 may be allocated for different purposes.

The system controller 301 can have a server/archive terminal unit 304 that preferably includes database management software for providing for efficient transfer and analysis of engine data files, as it retrieves downloaded files from the ground subsystem. As a non-limiting example, such database management software may delete existing files from a base station segment's memory once the files have been retrieved.

Figure 5:
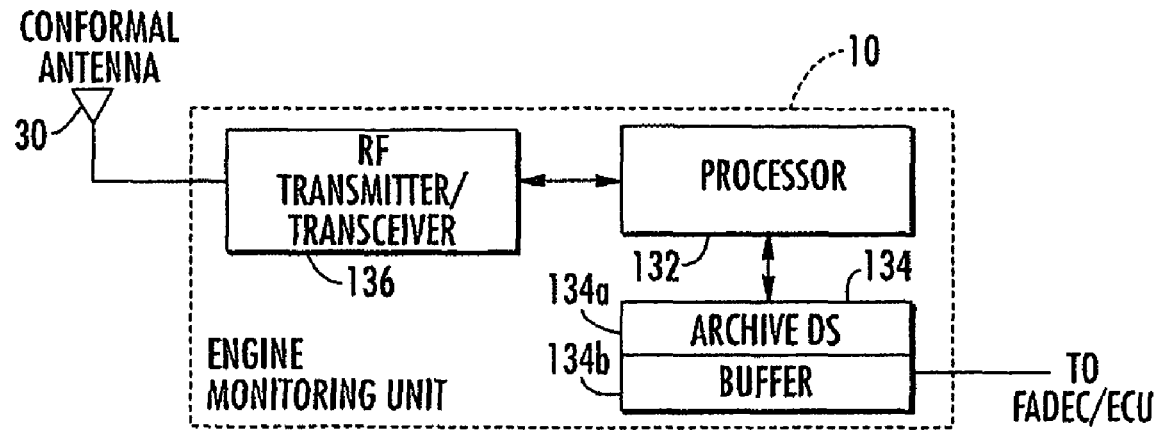
FIG. 5 is a block diagram showing basic components of a WEMS module that could be used in the present invention.

As described briefly above, and as diagrammatically illustrated in FIG. 5, each WEMS module 10 can include a bidirectional wireless (radio frequency carrier-based) subsystem containing a processing unit such as a microprocessor 132 and associated memory or data store 134, serving as both an archival data store 134a and a buffer 134b for communications, including packet communications. The memory 134 is coupled to the FADEC/ECU. Processing unit 132 can receive and compress the engine data and store the compressed data in its associated memory 134. A report can be generated by the processing unit 132, which includes many items of engine data.

The engine data and reports can be downloaded via the RF transceiver 136 and its preferred conformal antenna 30. To provide bidirectional RF communication capability, the transceiver 136 is operative with the wireless router 201 for upload and download of data.

If the RF communication link is spread spectrum, and a preferred 802.11 link, each of a plurality of sub-band channels of an unlicensed 2.4-2.5 GHz S-band segment of interest in this non-limiting example can be available and preferably used. Other unlicensed or licensed bands could be used. A wireless router 201 could continuously broadcast an interrogation beacon that contains information representative of the emitted power level restrictions at an airport. Using an adaptive power unit within its transceiver, the WEMS module 10 could respond to this beacon signal by adjusting its emitted power to a level that will not exceed communication limitations imposed by the jurisdiction governing the airport. The wireless (RF) transceiver 136 then accesses the engine data file stored in memory 134, encrypts the engine data and transmits the engine data file via a selected sub-channel of the wireless ground communications link to a wireless router 201.

The recipient wireless router 201 forwards the data file to the base station segment temporarily until the file can be automatically transmitted over the communications path 230 to the remote engine data control center 300 for analysis. Further details of the associated components are described in the above-identified and incorporated by reference patents.

In the present claimed invention, the wireless engine monitoring system (WEMS) uses similar components as in the GDL unit described in the incorporated by reference '165, '179 and '734 patents, but has reduced size and functionality for interfacing with the FADEC/ECU and mounting on the engine. The WEMS module is installed on the engine typically under the cowling and in a location to give the best antenna and transceiver functionality, but preferably adjacent or near the FADEC/ECU. It is possible to incorporate the WEMS module with the FADEC/ECU. The WEMS module records, stores, encrypts and transmits "full flight" engine data and interfaces directly to the FADEC/ECU. It can record hundreds of engine parameters with one second sampling frequency as an example and is a miniaturized module with a conformal antenna. It acquires "full flight" engine data and allows advanced prognostics and diagnostics techniques either on-board or preferably at a remote workstation to increase "time on wing" and decrease engine maintenance costs. It is an automated wireless solution installed directly on the engine and records full flight engine data for large turbine engines and results in large megabyte files using the high speed data link as described before. It is an improvement over those systems that record only a few engine data "snapshots," resulting in limited data and limited analysis.

For purposes of reference, a jet engine is described with reference to FIGS. 6 and 7 on which the wireless engine monitoring system (WEMS) module 10 of the present invention can be mounted. Each engine can have one engine mounted WEMS module and each WEMS module can have a specific data address, such as an internet address or other IP address, to allow service providers to access the WEMS module and its data in near real time and perform "smart" maintenance. This address is linked to the engine serial number and will be used to store routine and critical engine information. The present invention can thus reduce engine maintenance cost per hour (MCPH).

Figure 6:
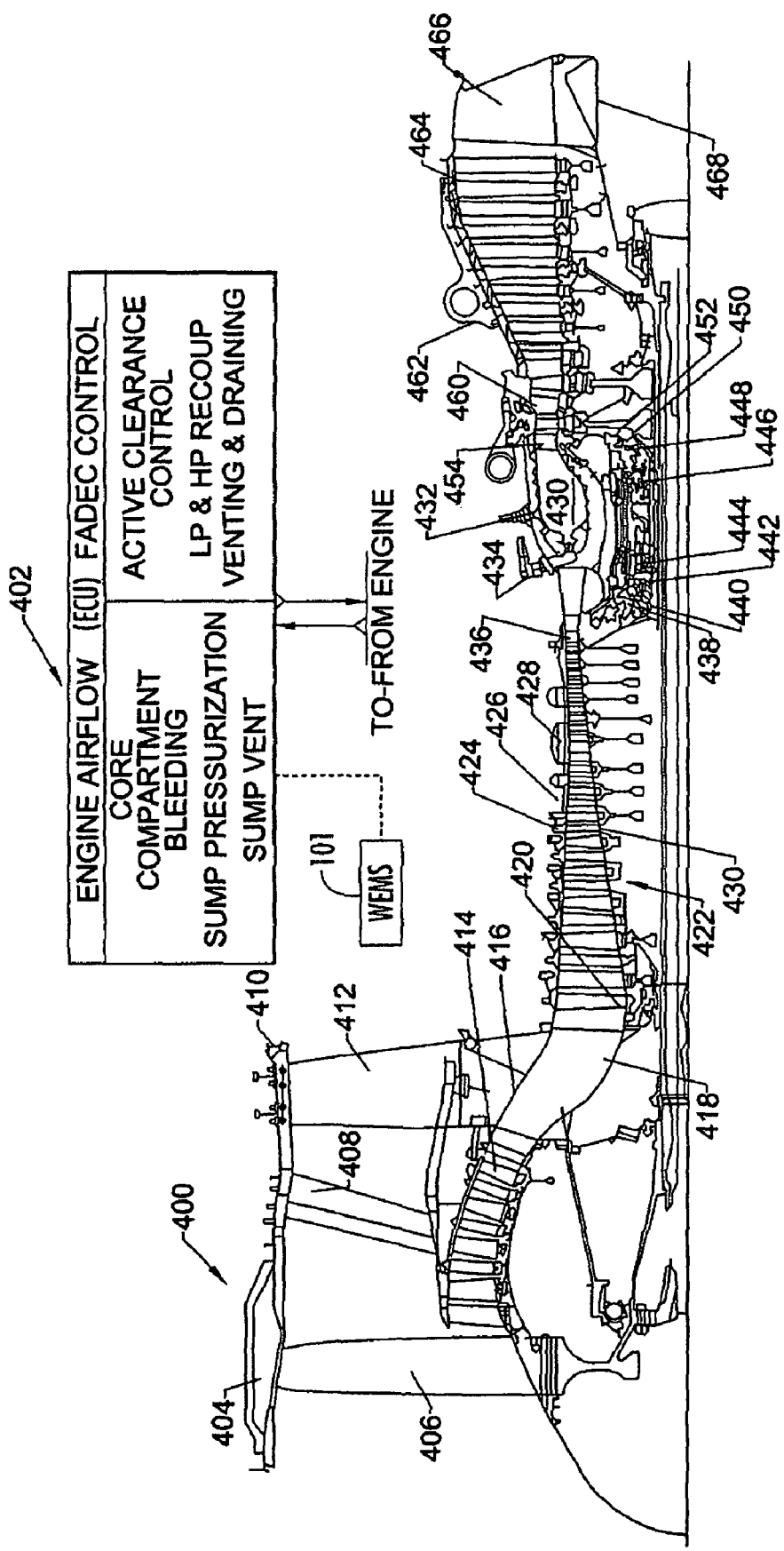
FIG. 6 is a cross-section of an example of a jet engine that generates engine events to be collected and transmitted from the WEMS module of the present invention.

FIG. 6 illustrates one cross-section of a jet engine indicated generally at 400, showing basic components and engine air flow FADEC/ECU control 402 to and from the jet engine that can be used for real time monitoring of engine events. These events could be downloaded during the first minute or so of initial take-off to a remote engine data control center 300 or saved to memory in the WEMS module and later downloaded to determine if "on wing" maintenance is warranted at the destination.

For purposes of clarity, reference numerals to describe this jet engine begin in the 400 series. As shown in FIG. 6, the engine air flow FADEC/ECU control 402 could include the core compartment bleeding; sump pressurization; sump venting; active clearance control; low pressure and high pressure recoup; and venting and draining functions. These functions could be monitored through basic FADEC/ECU control system 402, as known to those skilled in the art. The engine example in FIG. 6 corresponds to a General Electric CF6-80C2 advanced design with a FADEC/ECU or PMC control having an Nl thrust management and common turbo machinery. Although this jet engine is illustrated, naturally other control systems for different jet engines could be used, as known to those skilled in the art.

The engine as illustrated has six variable stages and a ruggedized stage one blade with a low emission combuster and 30 pressurized nozzles and improved emissions. It has a Kevlar containment to give a lower containment weight and a composite fan OGV. It has an enhanced HPT with a DS stage of one blade material and a TBC, with advanced cooling and active clearance control.

The fan module includes an aluminum/Kevlar containment 404 and a 93-inch improved aero/blade 406. It has compositive OGV's 408 with an aluminum/composite aft fan case 410 and a titanium fan frame 412 for reduced losses. It additionally has a four stage orthogonal booster 414 and a variable bypass valve (VBV) between the fan struts (with 12 locations) 416. The engine includes a compressor inlet temperature (CIT) probe 418.

The high pressure compressor includes an IGV shroud seal 420 and a blade dovetail sealing 422 with a trenched casing of stages 3-14 424. The compressor includes a vane platform sealing 426 and a short cord stage 8 low loss bleed system 428 and improved rubcoat reduced clearances 430.

The compressor rear frame includes a combuster 430 and ignitor plug 432 with a fuel nozzle 434 and OGV 436. It includes a vent seal 438 and 4R/A/o seal 440 and 4R bearing 442 and 4B bearing 444. It also includes a 5R bearing 446 and 5R/A/o seal 448, a diffuser 450 and pressure balance seal 452. The compressor rear frame also includes a stage 1 nozzle 454.

The high pressure turbine area includes an active clearance for control stages 1 and 2, and coated shrouds indicated at 456. It also includes directionally solidified stage 1 blades and damped blades 458 and a cooling air delivery system. The high pressure turbine include a thermally matched support structure, and an active clearance control and simplified impingement with a cradled vane support and linear ceiling. The improved inner structure load path has improved roundness control, solid shrouds and improved ceiling. These components are located in the area generally at 460 of the high pressure turbine area.

Low pressure turbine technology area includes a clearance control 462, a 360° case 464, aerodynamic struts 466 that remove swirl from the exit gas and a turbine rear frame 468 formed as a one piece casting.

Many of these components can have sensors and structural force sensor that generate signals during initial take-off such that signals are relayed via the WEMS module to an onground maintenance crew and/or separate remote engine data control center having its own processor.

Figure 7:
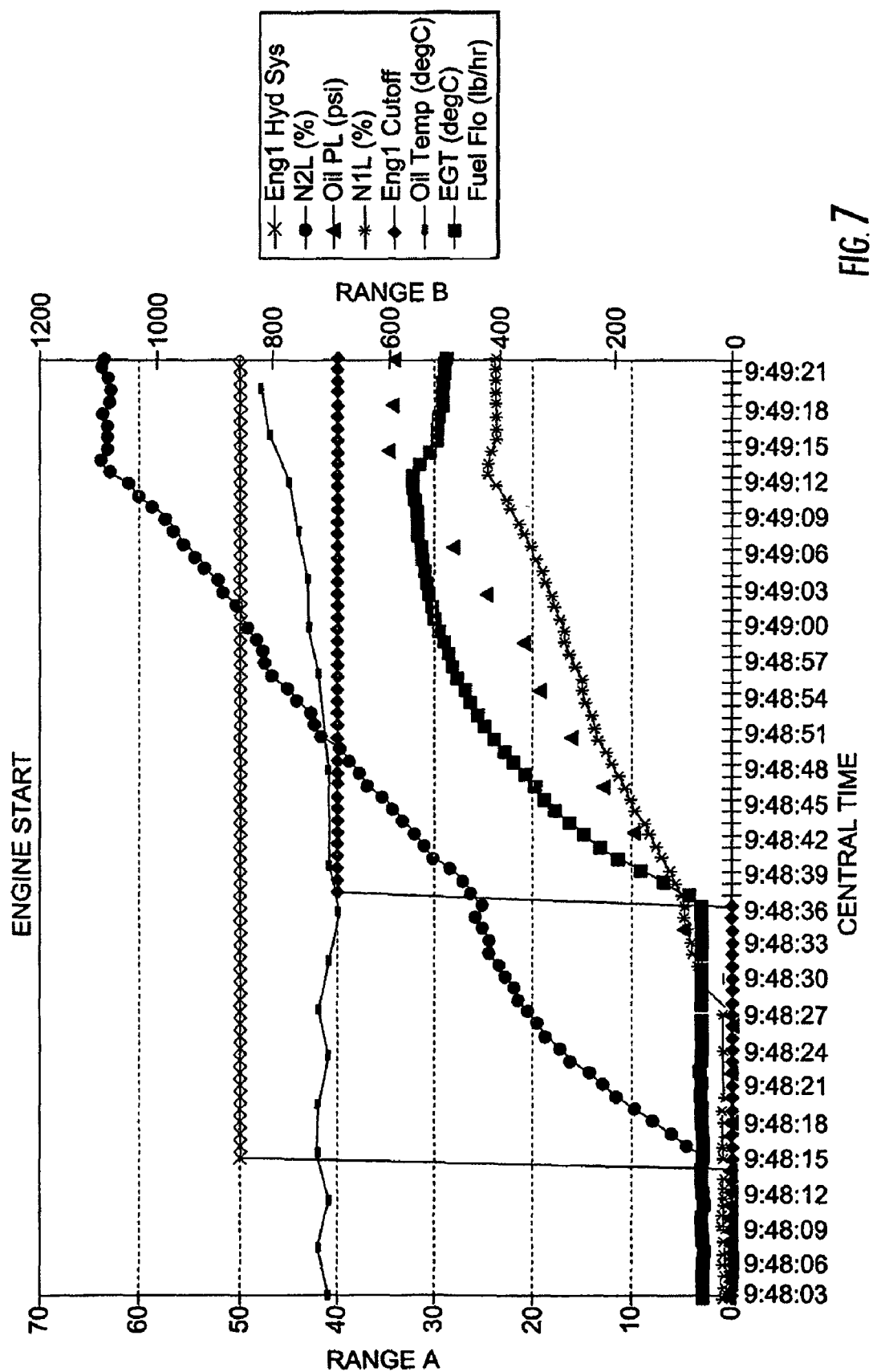
FIG. 7 is a chart showing various jet engine event reports at engine start that could be monitored by the WEMS module of the present invention.

FIG. 7 illustrates components that were monitored during engine start in one example, including the engine hydraulic system, the oil pressure (psi), the engine cut-off switch, oil temperature (deg C.), fuel flow (lb/hr), the N2L and N1L both in percentage terms, oil temperature and EGT, both in centigrade, and $W_f$. Some of the ranges are shown on the vertical axis of the graph, while time is shown on the horizontal axis of the graph.

This information can be downloaded via the WEMS module of the present invention to a ground based processor and a remote engine data control center can determine if on wing maintenance is warranted at the destination station.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for providing a record of the performance of an aircraft engine comprising:
   an engine monitoring module mounted on the aircraft engine for collecting engine data relating to flight operation of the aircraft engine, the engine monitoring module having an address linked to a serial number of the aircraft engine for tracking the aircraft engine;
   a processing unit coupled to said engine monitoring module and comprising a microprocessor for processing said engine data and generating reports relating to said engine data identifying said reports as related to said aircraft engine, said processing unit further comprising a data store memory storing said engine data and said generated reports; and
   a transmitter electrically coupled to said processing unit for transmitting at least one of the engine data and the generated reports over a wireless communications signal to a ground-based receiver.

2. The system according to claim 1, wherein said processing unit compresses the received engine data and stores the compressed engine data in said data store memory.

3. The system according to claim 1, and further comprising a Full Authority Digital Engine Controller/Engine Control Unit (FADEC/ECU) operative with said aircraft engine for collecting engine data, wherein said engine monitoring module is electrically connected to said FADEC/ECU for collecting engine data.

4. The system according to claim 1, wherein said transmitter transmits over a wireless communications signal to a ground-based receiver using a cellular communications link.

5. A method for providing a record of the performance of an aircraft engine comprising:
   mounting an engine monitoring module on the aircraft engine,
   linking an address assigned to the engine monitoring module to a serial number of the aircraft engine for tracking the aircraft engine;
   collecting engine data relating to flight operation of the aircraft engine during flight of the aircraft;
   storing said engine data in a data store memory;
   processing said engine data in a processing unit associated with said engine monitoring module;
   generating reports relating to said engine data identifying said reports as related to said aircraft engine; and
   transmitting at least one of the engine data and the generated reports over a wireless communications signal to a ground-based receiver.

6. The method according to claim 5, including using a cellular network for transmitting the at least one of the engine data and the generated reports over a wireless communications signal.

7. The method according to claim 5, including using a spread spectrum communications signal for transmitting the at least one of the engine data and the generated reports.

8. The method according to claim 5, including compressing the engine data prior to storing the engine data in said data store memory.

9. A system for providing a record of the performance of an aircraft engine comprising:
   an engine monitoring module mounted on the aircraft engine for collecting engine data relating to flight operation of the aircraft engine, the engine monitoring module having an address linked to a serial number of the aircraft engine for tracking the aircraft engine;
   a processing unit coupled to said engine monitoring module for processing said engine data and generating reports relating to said engine data identifying said reports as related to said aircraft engine,
   a data store memory associated with said processing unit and storing said engine data; and
   a transmitter electrically coupled to said processing unit for transmitting at least one of the engine data and the generated reports over a wireless communications signal to a ground-based receiver.

10. A system for providing a record of the performance of an aircraft engine comprising:
    an engine monitoring module mounted on the aircraft engine for collecting engine data relating to flight operation of the aircraft engine, the engine monitoring module having an address linked to a serial number of the aircraft engine for tracking the aircraft engine;
    a processing unit coupled to said engine monitoring module and comprising a microprocessor for processing said engine data and generating reports relating to said engine data identifying said reports as related to said aircraft engine, said processing unit comprising a data store memory storing said engine data and said generated reports; and
    a transceiver electrically coupled to said processing unit for transmitting at least one of the engine data and the generated reports over a wireless communications signal to a ground-based receiver.

11. The system according to claim 10, wherein said transceiver is operative to receive uploaded data.

12. The system according to claim 11, wherein said uploaded data includes algorithms for on-board processing of engine data.

13. A system for providing a record of the performance of an aircraft engine comprising:
    an engine monitoring module mounted on the aircraft engine, the engine monitoring module collecting engine data relating to operation of the aircraft engine, the engine monitoring module having an address linked to a serial number of the aircraft engine for tracking the aircraft engine, the engine monitoring module comprising a processing unit for processing said engine data; and a transmitter electrically coupled to said engine monitoring module, the transmitter operable to transmit the engine data over a wireless communications signal.

14. The system according to claim 13, further comprising a data store memory coupled to said processing unit and storing the collected engine data.

15. The system according to claim 14, wherein said processing unit generates reports relating to said engine data identifying said reports as related to said aircraft engine.

16. The system according to claim 15, wherein said generated reports are transmitted by said transmitter.

* * * * *